United States Patent
Higano et al.

(10) Patent No.: US 7,346,960 B2
(45) Date of Patent: Mar. 25, 2008

(54) TWO-SHAFT HINGE EQUIPPED WITH A ROTATION LIMITING MECHANISM

(75) Inventors: Sakae Higano, Saitama (JP); Hitoshi Sato, Tokyo (JP); Minoru Ohiraki, Chiba (JP)

(73) Assignee: Mitsubishi Steel Mfg. Co., Ltd., Tokyo (JP)

( * ) Notice: Subject to any disclaimer, the term of this patent is extended or adjusted under 35 U.S.C. 154(b) by 223 days.

(21) Appl. No.: 10/531,088

(22) PCT Filed: May 27, 2004

(86) PCT No.: PCT/JP2004/007650

§ 371 (c)(1),
(2), (4) Date: Apr. 11, 2005

(87) PCT Pub. No.: WO2004/109131

PCT Pub. Date: Dec. 16, 2004

(65) Prior Publication Data

US 2006/0059661 A1 Mar. 23, 2006

(30) Foreign Application Priority Data

Jun. 3, 2003 (JP) .............................. 2003-158306

(51) Int. Cl.
*E05D 3/00* (2006.01)
*E05D 3/10* (2006.01)
*E05D 3/06* (2006.01)

(52) U.S. Cl. .......................................... 16/367; 16/366
(58) Field of Classification Search ............. 16/366, 16/367, 371, 303, 330, 374; 361/680–682; 455/575.1, 575.3, 90.3; 379/433.13; 248/917–921
See application file for complete search history.

(56) References Cited

U.S. PATENT DOCUMENTS

| 7,006,853 B2 * | 2/2006 | Kang et al. ............... 455/575.3 |
| 2004/0025299 A1 * | 2/2004 | Higano et al. ................. 16/342 |

(Continued)

FOREIGN PATENT DOCUMENTS

| JP | 2002-155923 | 5/2002 |
| JP | 2003-152357 | 5/2003 |
| WO | WO 03/078854 | 9/2003 |

*Primary Examiner*—Robert J. Sandy
(74) *Attorney, Agent, or Firm*—Flynn, Thiel, Boutell & Tanis, P.C.

(57) ABSTRACT

A two-shaft hinge component equipped with a rotation limiting mechanism in which a construction is adopted that makes possible a rotation limiting mechanism with increased durability, reduced size and lighter weight. A torque unit is constituted by a fixed cam and a rotary cam being in coaxial abutment with a rotary shaft and an opening/closing shaft, in a hinge of two-shaft construction in which a rotary shaft passes through an opening/closing shaft, sliding frictional torque and a click action being generated during rotation and opening/closing operation by an abutting cam surface. The torque unit is constructed independently on the rotary shaft and the opening/closing shaft and, in addition, there is provided a rotation limiting mechanism whereby the rotary action of the rotary shaft is subjected to limitation in accordance with the opening/closing angle of the opening/closing shaft. With the two-shaft hinge according to the present invention, a reduction in size and weight is achieved by reducing the number of components, a stable torque and click action are generated, durability is improved and additional space is secured by a concentrated arrangement of the components.

14 Claims, 12 Drawing Sheets

U.S. PATENT DOCUMENTS

2004/0143936 A1* 7/2004 Hsu .............................. 16/367
2005/0136970 A1* 6/2005 Kim ......................... 455/550.1
2005/0177978 A1* 8/2005 Satoh et al. ................... 16/319
2005/0198779 A1* 9/2005 Jung et al. .................... 16/367

* cited by examiner

FIG. 7
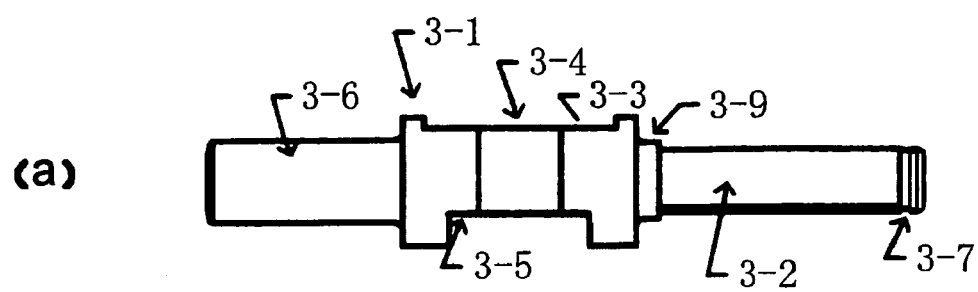
(a)
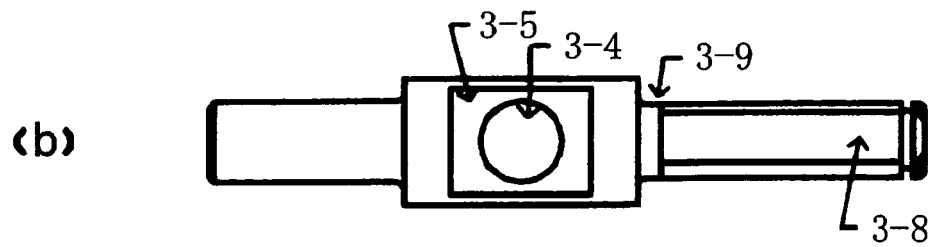
(b)
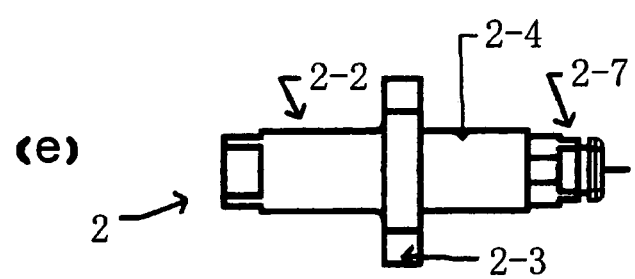

FIG. 9
(a)
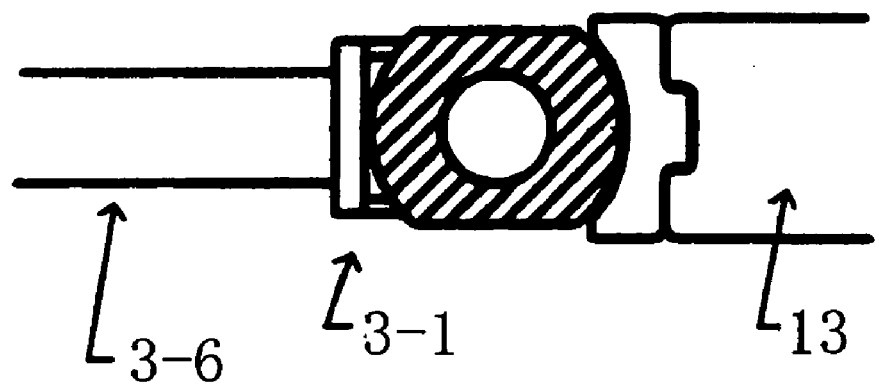
(b)
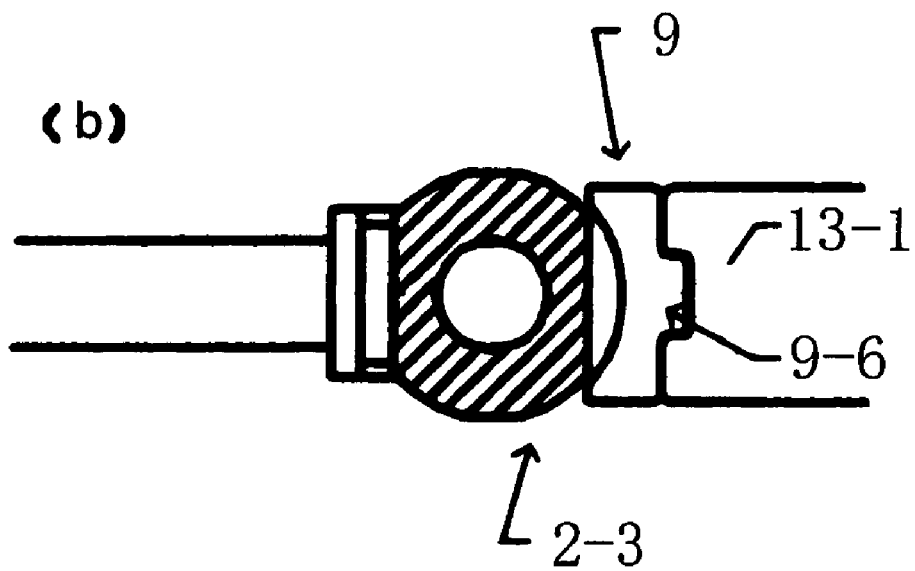
(c)
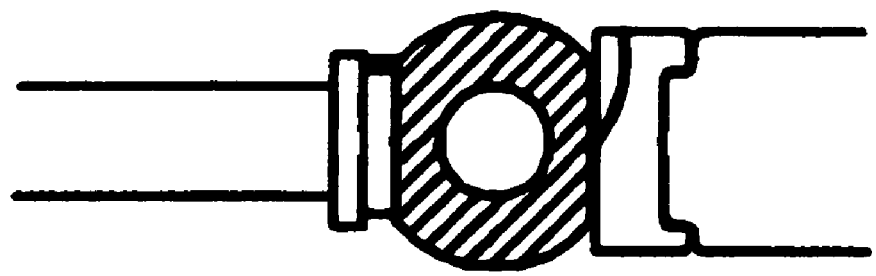

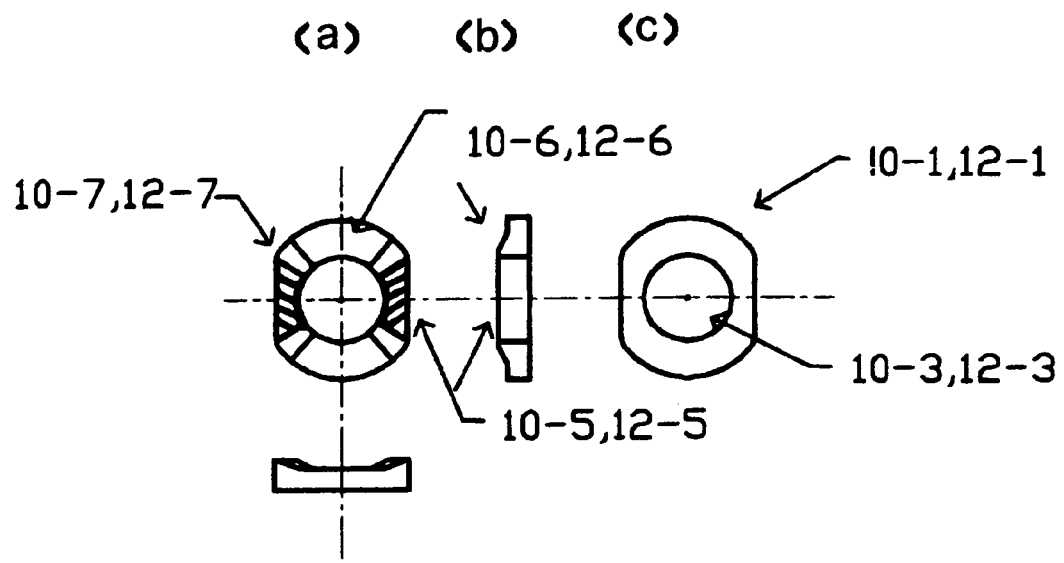
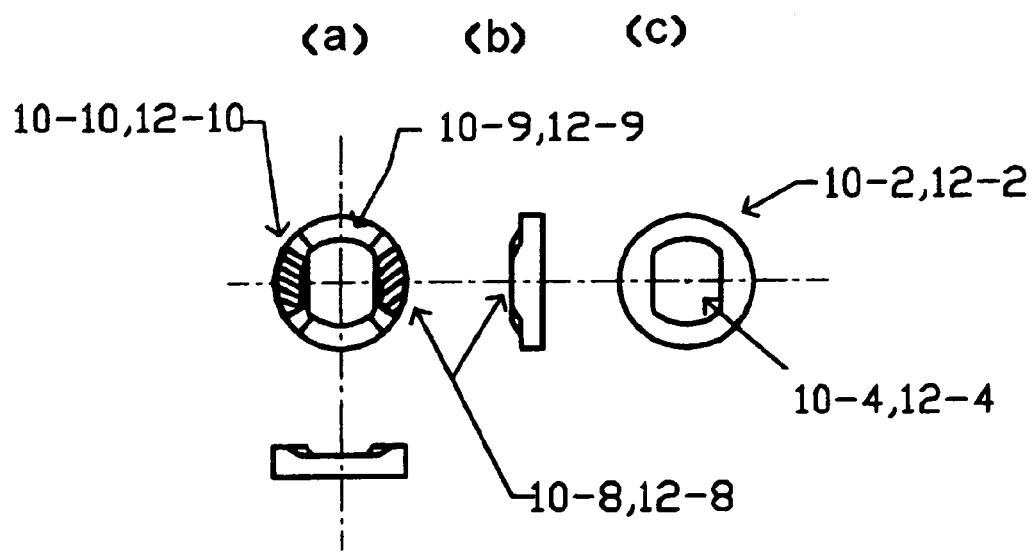

TWO-SHAFT HINGE EQUIPPED WITH A ROTATION LIMITING MECHANISM

TECHNICAL FIELD

The present invention relates to a two-shaft type hinge component that is employed in the fold-up/rotary mechanism of small electronic devices such as portable telephones, laptop personal computers, electronic notebooks, DVD monitors or remote controllers.

BACKGROUND ART

The frictional torque generating mechanism for the opening/closing shaft and rotary shaft of a prior art two-shaft hinge comprised, in practically all cases, a mechanism in which a plate member was coiled onto a shaft or a mechanism in which rotary frictional torque was generated by a construction in which pressure was applied by a dish spring.

FIG. 16 shows an example of a prior art two-shaft hinge shown in Japanese Patent Publication No. 2002-155923. In this hinge, a plate spring 54 formed in corrugated fashion and brackets 56 are fixed to the shaft at both ends of a press-formed opening/closing shaft 52 by means of a fixing flange 53. Also, a rotary shaft 57 is arranged penetrating to the middle of the opening/closing shaft 52; rotary frictional torque is generated by the method of pressure contact with a plate spring 59.

With the prior art hinge product, due to the fact that no rotary angle stop mechanism of the opening/closing shaft to limit rotation of the rotary shaft was provided and, in addition, due to the method of generating torque by pressing the friction plate into contact using the repulsive force of the dish spring, there were problems of looseness, rattling or poor durability caused by wear of the frictional plates 52, 56 or deformation (weakening) of the plate spring 54. Torque fluctuation or deterioration of durability produced by secular changes not only impairs the quality of the device but may also cause failure. Accordingly, as considered in the above reference, in recent two-shaft hinges, compared with prior art products, closer attention is paid to ease of operation and feeling during opening/closing or rotating, as well as the mechanism for limiting the angle of rotation or opening and closure, and maintenance of a stable torque value, high durability and also a reduction in size and weight are strongly demanded.

DISCLOSURE OF THE INVENTION

The problem that the present invention is intended to solve is to provide a two-shaft hinge component whereby durability, reduction in size and reduction in weight can be achieved in portable telephones or notebook type personal computers in which a smaller size and lighter weight are demanded.

The present invention is constituted as following (1)-(9).

(1) A two-shaft hinge that has a rotary shaft and an opening/closing shaft and enables a rotational action and an opening/closing action, wherein, the rotary shaft is inserted into the opening/closing shaft by fitting the rotary shaft into a through hole provided in a vertical direction with respect to a longitudinal direction of the opening/closing shaft;

a fixed cam, a rotary cam and a spring are inserted into each of the rotary shaft and the opening/closing shaft;

the fixed cam and the rotary cam abut by the spring force;

the abutting cams and the spring compose a torque unit that independently generates a sliding frictional torque at the rotational action and the opening/closing action;

a rotational action of the rotary shaft is limited by a rotation limiting mechanism depending on a rotational angle of the opening/closing shaft; and the rotation limiting mechanism limits the action by abutting faces to limit at two locations provided between the rotary shaft and the opening/closing shaft.

(2) A two-shaft hinge equipped with a rotation limiting mechanism that has a rotary shaft and an opening/closing shaft and enables a rotational action and an opening/closing action, wherein, the rotary shaft is inserted into the opening/closing shaft by fitting the rotary shaft into a through hole provided in a vertical direction with respect to a longitudinal direction of the opening/closing shaft;

a fixed cam, a rotary cam and a spring are inserted onto each of the rotary shaft and the opening/closing shaft;

the fixed cam and the rotary cam abut by the spring force;

the abutting cams and the spring compose a torque unit that independently generates a sliding frictional torque at the rotational action and the opening/closing action;

a rotational action of the rotary shaft is limited by a rotation limiting mechanism depending on a rotational angle of the opening/closing shaft; and the rotation limiting mechanism limits the action by abutting faces to limit at a single location provided between the rotary shaft and the opening/closing shaft.

(3) A two-shaft hinge equipped with a rotation limiting mechanism according to the above-mentioned (1) or (2), wherein, a part of the rotary shaft has a cross-section which has a long diameter and a short diameter, and a width of an aperture thereof has a width such as to obstruct rotation of the rotary shaft while abutting on this cross-section, depending on an angle of opening/closure of the opening/closing shaft and a width such as to make rotation of the rotary shaft possible, or, a rotation limiting groove or a rotation limiting plate is formed in an area on a side of a drive body.

(4) A two-shaft hinge equipped with a rotation limiting mechanism according to the above-mentioned (1) or (2), wherein, the opening/closing torque mechanism of the opening/closing shaft is arranged concentrated on one side, either left or right of an axial direction with respect to the shaft hole of the opening/closing shaft through which the rotary shaft passes, while the other side thereof constitutes a space region for wiring or the like.

(5) A two-shaft hinge equipped with a rotation limiting mechanism according to the above-mentioned (1) or (2), wherein, the opening/closing torque mechanism of the opening/closing shaft comprises units at two or more locations, said units generating a frictional torque by a repulsive force of the spring at the abutting cam faces by abutting the rotary cam capable of rotation and the fixed cam that is movable in an axial direction and rotates in unison with the opening/closing shaft and engaging the fixed cam and the rotary cam through the opening/closing shaft.

(6) A two-shaft hinge equipped with a rotation limiting mechanism according to the above-mentioned (1) or (2), wherein a range of rotation of the rotary shaft and the opening/closing shaft is limited by providing a stop mechanism for limiting the rotation and opening/closing angle of the rotary shaft and the opening/closing shaft.

(7) A two-shaft hinge equipped with a rotation limiting mechanism according to the above-mentioned (1) or (2), wherein, in order to generate a click action at a specified position during the rotational action and the opening/closing action of the rotary shaft and the opening/closing shaft, a mechanism that generates a click action is provided by providing a projection and recess on the fixed cam and the rotary cam constituted on the shafts for generating torque and abutment of the projection and recess of the fixed and the rotary cam, or by adding an abutment location of a projection and recess on the rotary shaft and the opening/closing shaft.

(8) A two-shaft hinge equipped with a rotation limiting mechanism according to the above-mentioned (1) or (2), wherein the rotary shaft and the opening/closing shaft respectively have a cross-section formed to be a cross-section other than circular at a sliding location of the fixed cam so that the fixed cam integrally rotates with the shafts while sliding.

(9) A two-shaft hinge equipped with a rotation limiting mechanism according to the above-mentioned (1) or (2), wherein a bracket component is added on the opening/closing shaft so as to dispose and fix the two-shaft hinge to an outer frame, and the hinge is fixed by the bracket.

BRIEF DESCRIPTION OF THE DRAWINGS

FIG. 7 shows an embodiment of the invention, (a) being a front view of the opening/closing shaft, (b) being a plan view of the opening/closing shaft, (c) being a cross-sectional view of the rotation limiting section, (d) being a front view of the rotary shaft and (e) being a plan view of the rotary shaft.

FIG. 9 is a example of an embodiment of the operation of the rotation limiting mechanism employed in the invention, (a) being a plan view of the first stage thereof, (b) being a plan view of the second stage thereof and (c) being a plan view of a third stage thereof.

FIG. 11 shows an embodiment of a rotary cam employed in the invention, (a) being a front view, (b) being a side view and (c) being a rear view.

FIG. 12 shows an embodiment of a fixed cam employed in the invention, (a) being a front view, (b) being a side view and (c) being a rear view.

BEST MODE FOR CARRYING OUT THE INVENTION

Embodiments of the present invention are described below with reference to the drawings.

Figure 1:
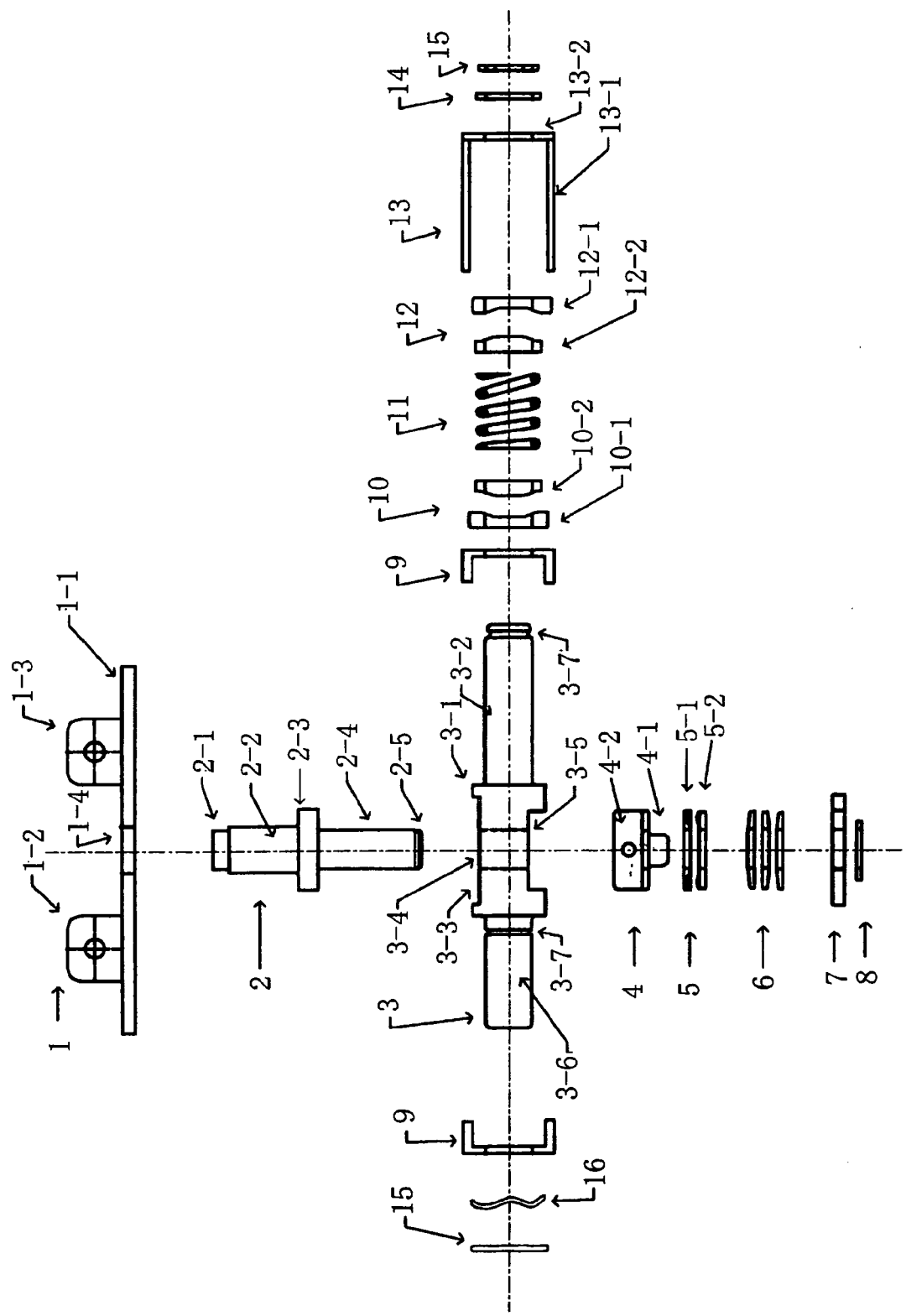
FIG. 1 is a view showing the constitution of components illustrating an embodiment of the invention.

FIG. 1 shows the parts making up an example of an embodiment of the two-shaft hinge equipped with a rotation-limiting mechanism. From the top of the Figure, the rotary system, which is on the rotary shaft of the two shafts, comprises the following: a bracket 1 on which the liquid-crystal monitor is mounted, a rotary shaft 2, a rotation stop plate 4 with a screw-hole, rotary and fixed cams 5, a dish spring 6, a rotary locking plate 7 and a stop ring 8 for the rotary shaft.

Also, from the left-hand side of the Figure, the opening/closing system, which is on the opening/closing shaft, namely, the other shaft, comprises the following components: a stop ring 15 for the opening/closing shaft, a corrugated plate spring 16, a left rotation limiting plate 9, an opening/closing shaft 3, a right rotation limiting plate 9, a rotary and fixed cam 10 for the opening/closing shaft, a coil spring 11, a fixed and rotary cam 12, an opening/closing shaft casing 13, a fixed friction plate 14, and a stop ring 15 for the opening/closing shaft.

In the bracket 1, ribs 1-2, 1-3 equipped with screw-holes for mounting of for example a liquid-crystal monitor are provided by flat plate pressing and a hole 1-4 with which the swaged end 2-1 of the rotary shaft is fitted and fixed by swaging is provided. On the rotary shaft 2, there are provided a swaged end 2-1 that is formed with a square shape, a shaft 2-2 having a circular cross-section on which is wound flat panel connector (FPC) wire, a rotation limiting plate 2-3 having an oval-shaped cross-section for limiting rotation, a shaft 2-4 having a square column cross-section with D cut or radiused corners, and a stop ring groove 2-5. A screw-hole 4-2 for fixing such as wiring and a stop plate section 4-1 used by assembling the rotary locking plate 7 on an L-shaped pressed member to limit the angle of rotation thereof are provided on the rotation stop plate 4 with a screw-hole. The cam set 5 for the rotary shaft comprise a rotary cam 5-1 having a recess at its surface and rotating in unison with the opening/closing shaft, and a fixed cam 5-2 having a projection at its surface and rotating in unison with the rotary shaft. The basic form of the rotary locking plate 7 is seen by referring to FIG. 4, which shows the assembled two-shaft hinge of the FIG. 1 from underneath. The rotary locking plate 7 has projections 7-1 and 7-2 and the combination of the projections and a stop 4-1 of the stop plate 4 restricts the angle of rotation (This rotational angle limitation is called as a stop mechanism in order to distinguish from the rotation limiting mechanism in claims) aside from the rotation limiting mechanism as described later. The rotational angle restriction mechanism of the stop mechanism will be explained later.

The assembly of the two-shaft hinge will be explained, starting with the description of the opening/closing shaft. The left-hand side portion of FIG. 1 is assembled as follows: the opening/closing shaft 3 is inserted into the left rotation limiting plate 9 and corrugated plate spring 16, and the stop ring 15 is pressed into the stop ring groove 3-7. On the right hand side, the opening/closing torque unit is constituted by the following: a joining face 9-5 of the right rotation limiting plate 9 is fitted and inserted into an opening/closing limiting plate joining face 3-1 of the opening/closing shaft 3 and the opening/closing shaft is inserted in a rotary cam 10-1 for the opening/closing shaft, a fixed cam 10-2 for the opening/closing shaft, a coil spring 11, and a further set of fixed cam 12-2 and rotary cam 12-1. Furthermore, the opening/closing shaft is inserted into the shaft hole 13-1 of the opening/closing shaft casing 13 and the fixed frictional plate 14, and, the stop ring 15 is pressed into the opening/closing shaft groove 3-7, with the spring 11 still compressed in the axial direction, and with pressing on the bottom plate 13-2 of the casing or the fixed frictional plate 14 by use of a jig or the like. In this case, the torque unit is composed of the shaft, the cam set and the spring, and is a section that generates a sliding frictional torque or a click action (pull-in action). Moreover, the rotation limiting plate 9 among the above is used in the rotation limiting mechanism of the present invention and the mechanism will be explained in detail below.

Next, the rotary shaft will be explained. As for the rotary shaft, the end 2-1 for swaging of the opening/closing shaft 2 is inserted into the bracket hole 1-4 and the bracket 1 and the shaft 2 are fixed by swaging. The shaft section 2-4 of the rotary shaft is inserted into a rotary shaft through-hole 3-4 of the opening/closing shaft 3, thereby, it will be rotatable through 360° in a condition with the flat face 3-3 of the opening/closing shaft and the limiting face 2-3 of the rotary shaft in abutment. The assembly of the rotary torque unit and the stop mechanism is achieved as follows: the remaining rotary shaft section 2-4 through which the opening/closing shaft 3 has passed is inserted into the rotation stop plate 4, it is brought tightly into contact with a flat portion 3-5 of the opening/closing shaft, thereafter, the rotary cam 5-1 for the rotary shaft, fixed cam 5-2, dish spring 6 and rotary locking plate 7 are assembled, and finally the stop ring 8 is pressed into the rotary shaft with the dish spring compressed.

Figure 2:
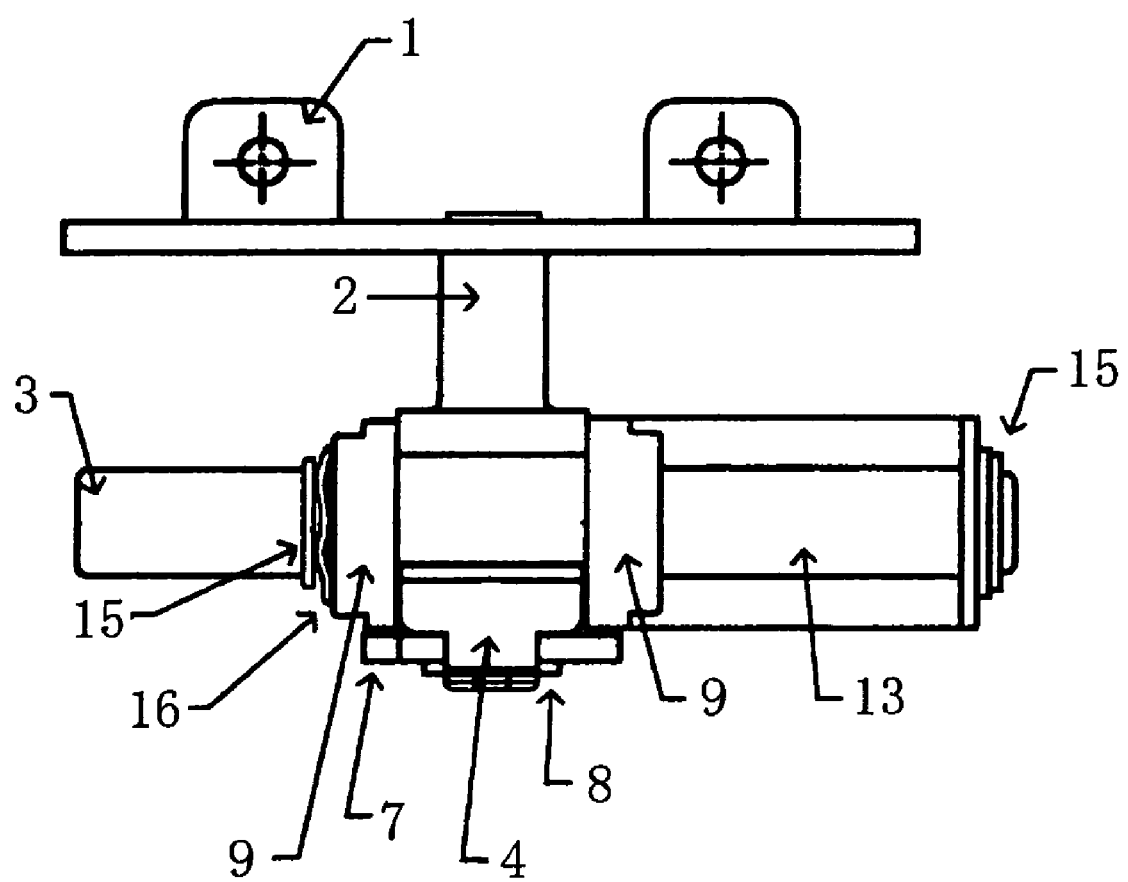
FIG. 2 is a front view showing an embodiment of the invention.

FIG. 2 is a front view of a completed product of the two-shaft hinge according to the first aspect of the present invention provided with a rotation limiting mechanism obtained by assembly of the components illustrated in FIG. 1 as described above. The two shaft hinge of FIG. 2 shows the appearance of the constitution of the rotation limiting mechanism to limit the rotational action of the rotary shaft 2 depending on the opening/closure angle of the opening/closing shaft 3 by abutting the oval-shaped rotation limiting plate 2-3 and the rotation limiting plate 9 at two locations on the left and the right. The abutting faces of the two parts correspond to the abutting faces to limit at two locations of the present invention and the rotation limiting mechanism achieved thereby is a remarkable feature of the present invention. It can be seen from the component constructional view of FIG. 1 and the product of FIG. 2 that the two rotation limiting plates (grooves) 9 provided on the opening/closing shaft 3 are brought into pressure contact with the limiting plate joining face 3-1 by the repulsive force of the spring 11, 15 against the stop ring 15 arranged at the shaft end. In FIG. 2, the rotation limiting plates 9 and the casing 13 are assembled by means of fitting grooves so as to suppress rattling during rotation. The casing 13 is either D-shaped or oval-shaped in cross-section by cutting a part of circle and can be fixed so that there is no rattling by the method of insertion fitting when mounted and fixed on the external frame. Also, although not shown in the drawing, the rotation limiting plates (grooves) 9 arranged on the left and right are coupled by a linking plate or the like.

FIG. 3(a) shows an example of the second aspect of the present invention in which the rotation limiting mechanism effects the limitation of the rotation of the rotary shaft by the abutting faces at a single location, in contrast with a method in which such a rotational limitation of the rotary shaft is implemented by the abutting faces of the rotation limiting plate 9 at two locations of the left and right shown in FIG. 2.

Also, FIG. 2 and FIG. 3(a) show an example in which the torque unit of the opening/closing shaft of the fourth aspect of the present invention, which is a combination of a cam set and a spring, is arranged concentrated on one side, either the left or the right side, in the axial direction with respect to the shaft hole of the opening/closing shaft, through which the rotary shaft passes, while the other side thereof provides a space region, for example, for wiring.

FIG. 3(b) is a right side view of (a). This shows that the stop ring 15 is a c-shaped ring and is pressed and fixed into a groove 3-7 for the stop ring (see FIG. 1) at the end of the opening/closing shaft and, furthermore, that the shaft cross-sectional face 3-2 of the opening/closing shaft 3 is of a special cross-sectional shape, i.e. oval-shaped. It also shows that the opening/closing shaft 3 is prevented from further anti-clockwise rotation by the leading end 4-1 of the rotation stop plate 4, which is L-shaped, being in contact with a projection 7-1 of a rotary locking plate 7 fixed to the rotary shaft 2, as shown in the bottom view of FIG. 4. This is the stop mechanism in which the leading end 4-1 limits the rotation of the rotary shaft 2 by engaging the rotation stop plate 4 and the rotation locking plate 7.

FIG. 3(c) is an example showing the condition in which the opening/closing shaft has rotated as far as an angle of 150°. FIG. 3(b) shows a condition in which the opening/closing shaft has rotated by 90° in the case of a portable telephone that folds in two, this condition is a position in which the telephone is opened perpendicularly from a condition in which the liquid-crystal screen for the monitor is closed. Also, (c) shows a condition in which the telephone is further opened by 60° from FIG. 3(b), i.e., it is the usual communication-ready position of a portable telephone equipped with a speaker and a microphone. FIG. 3(c) shows a condition in which the opening/closing shaft is opened by 150°. In this case, since no stop for limiting the angle of rotation is provided on the opening/closing shaft, clockwise rotation through 360° is possible. A cross-section of the opening/closing shaft casing 13 (hatched portion) presents an oval shape with both ends of the circle cut off.

Figure 3:
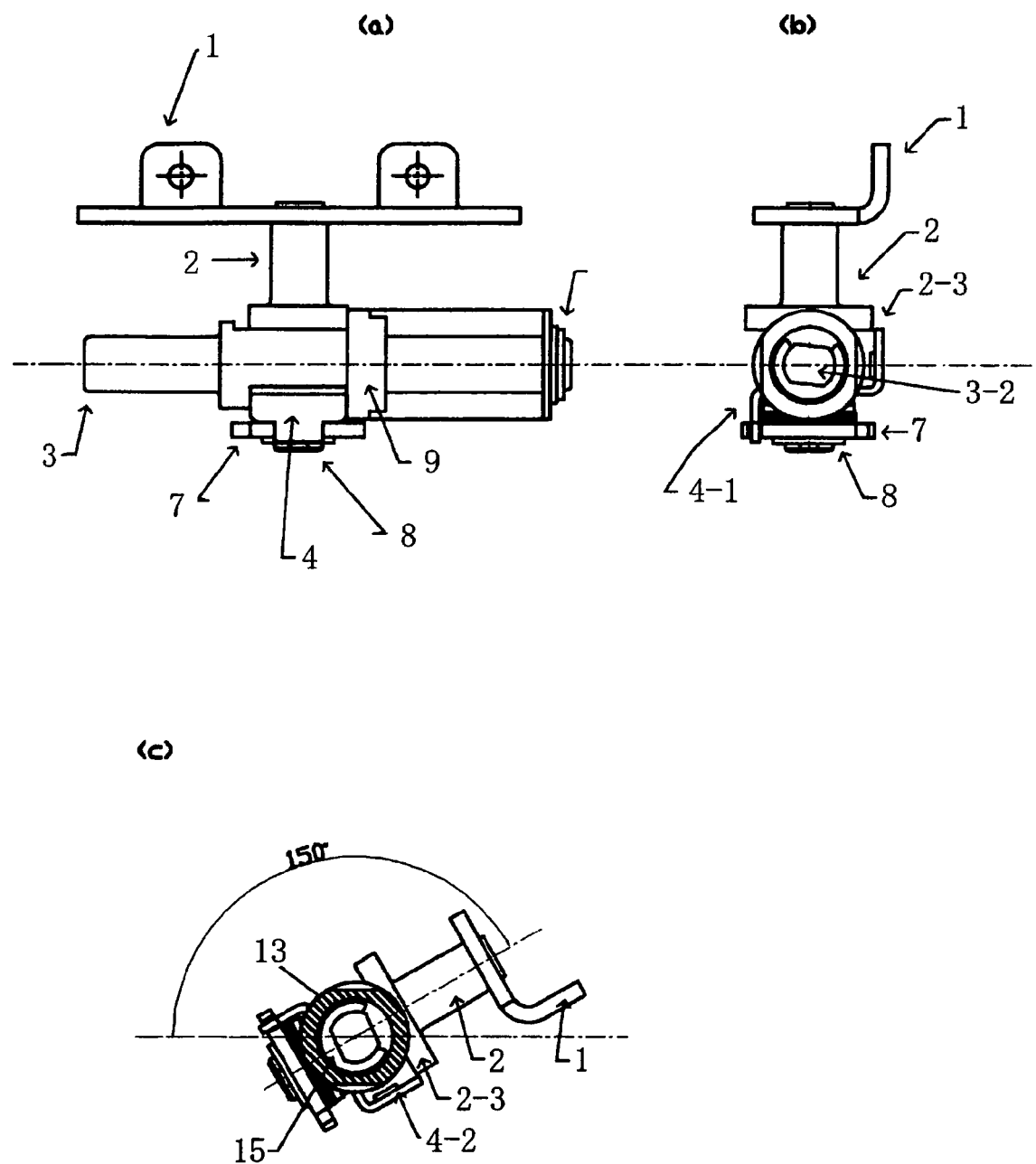
FIG. 3 shows an embodiment of the invention, (a) being a front view, (b) being a right side view and (c) being an example of rotary operation.
Figure 4:
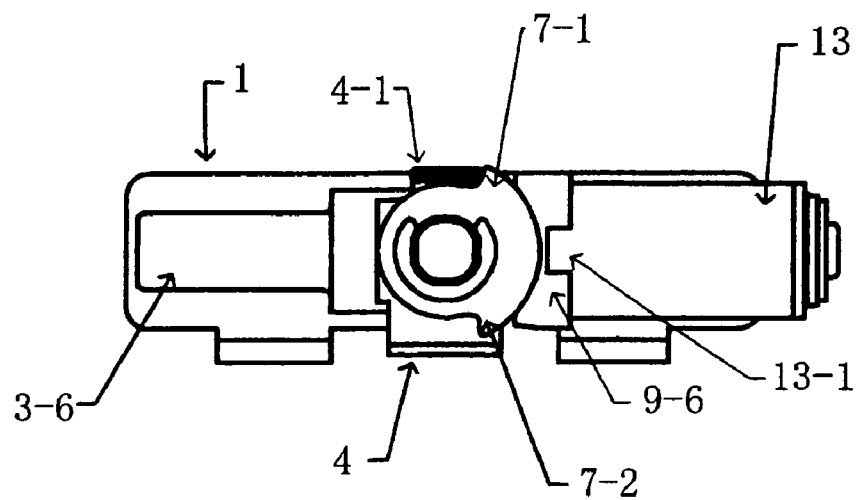
FIG. 4 is a bottom view showing an embodiment of the invention.

FIG. 4 is an example showing the stop mechanism for rotation around the rotary shaft according to the sixth aspect of the present invention, being a view showing the bottom face of the two-shaft hinge. Like FIG. 2 and FIG. 3, FIG. 4 shows the case where the bracket 1 and the opening/closing shaft 3 are positioned in parallel, showing the condition in which the leading end 4-1 of the rotation stop plate and the projection 7-1 of the rotary locking plate are in contact. In FIG. 4, the anti-clockwise rotation of the rotary shaft 2 is restricted, with the rotation being only possible by about 180° in the clockwise direction, the region in which rotation is possible is between the projections 7-1 and 7-2 of the rotation locking plate 7.

Figure 5:
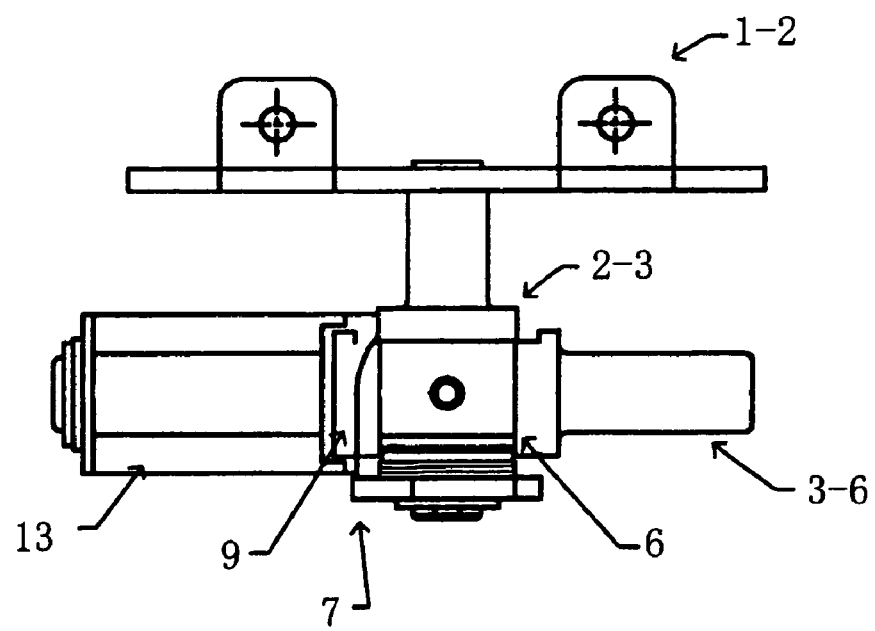
FIG. 5 is a rear view showing an embodiment of the present invention.

FIG. 5 is a rear view of FIG. 3(a). As for the rotation limiting mechanism, FIG. 5 shows the condition in which the rotation limiting plates (grooves) 9 that are assembled with the opening/closing shaft abut the limiting plate 2-3 of the rotary shaft. In the case of this Figure, it can also be seen that the rotation limiting plates (grooves) 9 are cylindrical and are of a shape in which the abutting circumferential faces thereof are recessed in a partially arcuate condition, namely, a sloped condition.

Figure 6:
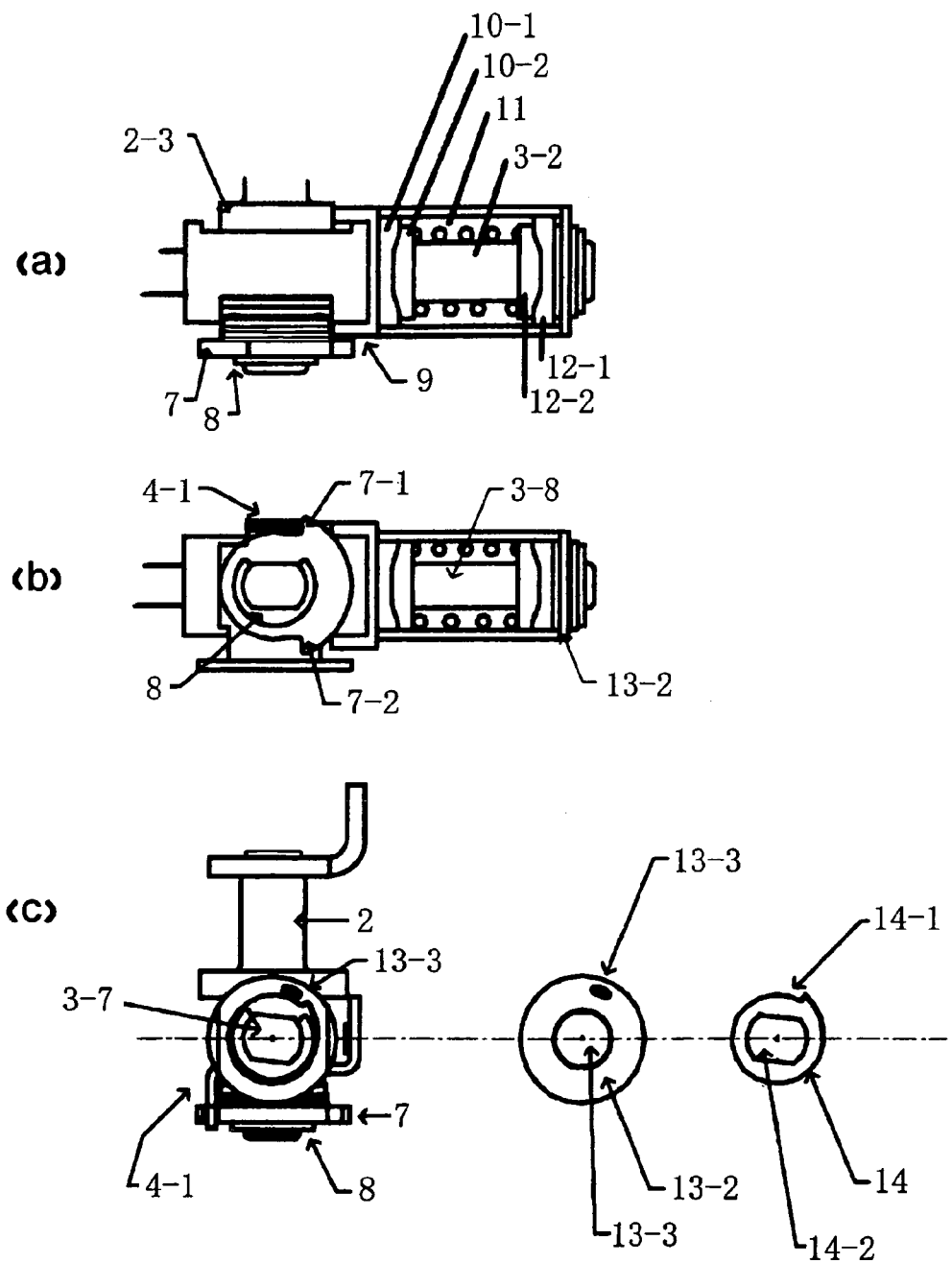
FIG. 6 shows an embodiment of the invention, (a) being an internal front view and (b) being a bottom view and (c) being a right side view.

FIG. 6 shows an example of a torque unit of the opening/closing shaft according to the fifth aspect of the present invention. The opening/closing torque unit arranged on the opening/closing shaft 3-2 comprises rotary cam 10-1, rotary cam 12-1, fixed cam 10-2, fixed cam 12-2 and a coil spring 11 that generates a sliding frictional torque and a click action (pull-in action) by pressure contact with the cams, on the opening/closing shaft 3-2. Regarding the shape of the rotary and fixed cams that are employed here, these are ring-shaped, as shown in FIGS. 11 and 12, with projections and recesses formed on the surface thereof on one side, the projections and recessed faces being abutment faces. FIGS. 6(*a*) and (*b*) show the case where the projections and recesses of both of the cam sets 10, 12 are fitted together and a spring 11 that supplies a repulsive force is extended in the axial direction. Various cam shapes may be selected for use from conditions such as the thickness, the presence or absence of projections or recesses, and their position of arrangement and height, depending on the required torque value and the click angle. Moreover, it can be seen that the opening/closing shafts 3-2, 3-8 on which the rotary and fixed cams are fitted are shafts of special cross-sectional shape, their shaft diameters (sizes) being different in FIG. 6(*a*), which is a front view, from FIG. 6(*b*), which is a bottom view thereof.

The components that rotate in unison with the opening/closing shaft 3-2 in FIGS. 6(*a*) and (*b*) are the fixed cams 10-2, 12-2, the spring 11, the fixed frictional plate 14 and the stop ring 15. Also, the components that rotate in unison with the opening/closing shaft casing 13, which plays the role of extracting the opening/closing torque to the outside, are the rotary cams 10-1, 12-1 that rotate around the opening/closing shaft 3-2, the casing bottom plate 13-2 and the rotation limiting plates 9.

FIG. 6(*c*) shows an example of the sixth aspect of the present invention in which the rotation stop mechanism that limits the rotational angle of the opening/closing shaft is additionally provided. A projection 13-3 is provided at the outer periphery of the casing bottom plate 13-2, then, the additional stop mechanism limits the rotational angle of the opening/closing shaft by abutting this projection against a projection 14-1 of the fixed frictional plate 14 that rotates in unison with the opening/closing shaft 3. FIG. 6(*c*) shows that when the opening/closing shaft 3 rotates further in the anti-clockwise direction, the projections 13-3 and 14-1 come into abutment, so that further rotation is prevented. Since the fixed frictional plate 14 is provided to rotate in unison with the opening/closing shaft 3, the shape of the shaft hole 14-2 and the end 3-7 of the opening/closing shaft are made oval-shaped, assembly being effected by pressing in, so as to prevent rattling.

FIG. 7 is an example of the eighth aspect of the present invention, the two shaft hinge, and the opening/closing shafts were drawn in (a) and (b) and the rotary shafts were drawn in (c) and (d). In the Figure, shafts are formed with a cross-sectional shape whose axial cross-section at the location where the fixed cam is positioned is processed is other than a circle. First of all, the cross-sections of the shafts at the portions 3-2, 3-8 of FIGS. 7(*a*) and (*b*) are oval-shaped, with parts of the circle cut away. It can be seen that this cross-section is a shape which makes it possible to rotate integrally with the shaft and to slide in the axial direction when the shaft is inserted into the shaft holes 10-4, 12-4 of the fixed cams shown in FIG. 12. Similarly, the rotary shaft (c) and (d) at the location 2-4 are square pillar-shaped with radiused corners, as shown on the right of (d), and inserted into the fixed cams shown in FIG. 14 and assembled. The portion 2-4 of this shaft and the portion 5-6 of the cam hole are manufactured with dimensions such as to enable the cam to integrally rotate with the shaft but with the cam allowed to slide in the axial direction.

In order to prevent rattling of the rotary shaft and to maintain stable rotation, it is desirable that the upper surface 3-3 and the lower surface 3-5 of the through-hole 3-4 of the opening/closing shaft 3 should be flat. Steps 3-9 provided on the shaft and the projection 3-1 maintain stable assembly and rotation of the limiting plates 9 by abutting on the shaft hole 9-3 and bottom 9-5 of the rotation limiting plates (grooves) 9 shown in FIG. 8. Here, a flat portion 3-8 of the opening/closing shaft 3 to be inserted into the fixed cam is manufactured inclined with respect to the axial center direction of the through-shaft (the face including the diameter of the rotary shaft inserted) from FIG. 7(*b*). The shaft end 3-7 of FIG. 6(*c*) shows an example of the assembly thereof. The purpose of making the inserted portions 3-8 of the shaft into these cams 10, 12 inclined, or of making the shaft hole 10-4, 12-4 of the fixed cams inclined, which is expected to show the same effect, is both in order to strengthen the rotary click feeling of the opening/closing shaft and to prevent rattling.

The rotation limiting plate 2-3 on the rotary shaft depicted in FIG. 7(*c*), (*d*) and (*e*) is of a cross-sectional shape having a long diameter and a short diameter obtained by cutting off portions of a cylinder to produce an oval shape having parallel sides. Limitation of rotation is effected by the outer periphery of this cross-sectional shape abutting the rotation limiting plates (grooves) 9. Although, in this case, the shaft rotation limiting plate 2-3 was manufactured as a unitary member from a round rod, it would also be possible to manufacture only limiting plates 2-3 for example by press forming and then to press these onto the shaft or to assemble a plurality of limiting plates 2-3 in order to provide a complex limiting action.

Figure 8:
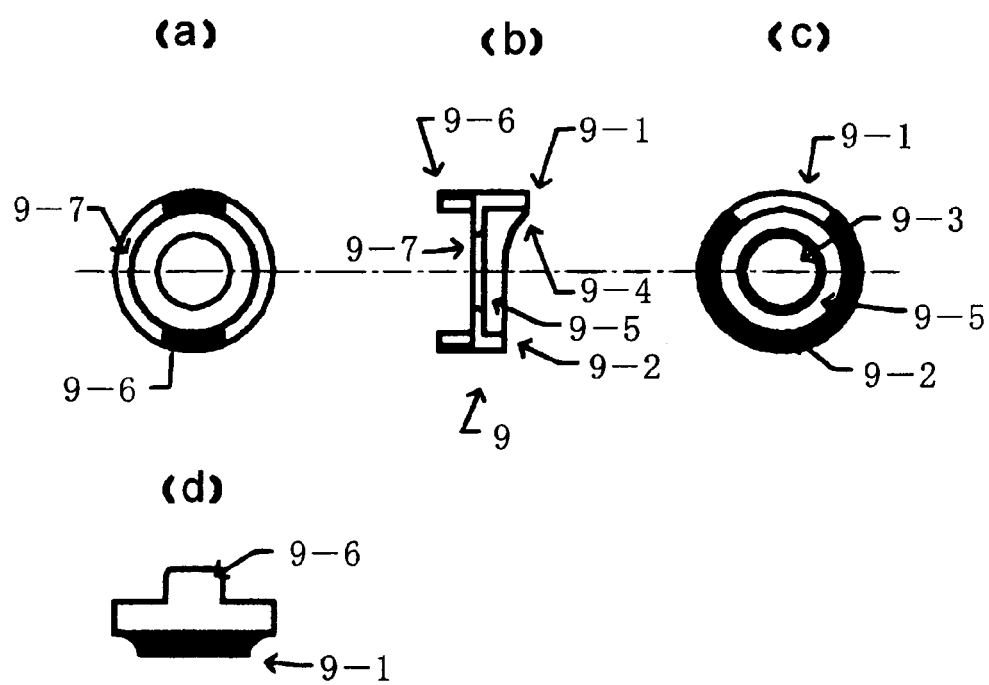
FIG. 8 is an example of an embodiment of a rotation limiting plate (groove) employed in the invention, (a) being a left side view, (b) being a cross-sectional view, (c) being a right side view and (d) being a plan view.

FIG. 8 shows the shape of a rotation limiting plate (groove) 9 that is employed in the rotation limiting mechanism, disposed on the opening/closing shaft and used in the third aspect of the present invention. (a) shows a location at which the casing 13 is coupled, projections 9-6 are provided at two locations to effect coupling. (b) shows the cross-section of the limiting plate (groove) 9; a coupling projection 9-6, a projection 9-1 on the cylindrical periphery of the limiting plate, a bottom (groove) section 9-2 of the cylindrical periphery and a slope starting section 9-4 are shown. In (c), the projection 9-1 is drawn in white, whereas the slope 9-4 and groove section 9-2 are depicted in black. A hole 9-3 and flat section 9-5 are assembled by fitting in with the respective steps 3-9 and 3-1 (see FIG. 7) of the opening/closing shaft. (d) is a side view seen from the shaft diameter. The rotation limiting plates (grooves) 9 shown in FIG. 8 are comparatively simple examples of limiting plates (grooves) 9 in which the projecting section 9-1 is at a single location and is narrower than the cylinder periphery, being about ¼ of the whole periphery.

FIG. 9 is a model given in explanation of the limiting mechanism in the case where the rotation limiting mechanism is provided at a single location. The opening/closing shaft 3 comprises a casing 13, a rotation limiting plate (groove) 9 drawn in FIG. 8, and a projection 3-1 that supports the rotation limiting plate 9. In the FIG. 9, the rotary shaft 2 is drawn vertically with respect to the paper face and the opening/closing shaft 3 is drawn in the paper face. The hatched section in FIG. 9 is the rotation limiting plate 2-3 of the oval-shaped rotary shaft 2 and it is assembled passing through the opening/closing shaft 3. (a) shows the case where a groove section 9-2 of the rotation limiting plate 9 drawn in FIG. 8 abuts the long diameter section of the limiting plate 2-3 on the rotary shaft. (b) shows a case where the rotary shaft 2 only has been rotated through 90°, with the limiting plate (groove) 9 left stationary. It can be seen that the rotary shaft 2 is not subjected to a rotation limitation, since, in the conditions of (a) and (b), the width of the long diameter section that is capable of rotation is guaranteed. In this embodiment of FIG. 9, this angular position where the rotary shaft can freely rotate is the position of FIG. 3(b) and is a position in which the rotary shaft 2 has rotated (opened) by 90° from the start position with respect to the opening/closing shaft 3. FIG. 9(c) shows the case where the opening/closing shaft 3 has been further rotated by 60° from FIG. 9(b). This produces a condition in which rotation cannot take place (the limitation applies), owing to the action that, the linear sections that is of the short diameter section of the limiting plate 2-3 of the rotary shaft 2 and is of the projection 9-1 of the rotation limiting plate 9 abut mutually.

FIG. 9 shows an example in which the rotation limiting mechanism is provided at a single location, however, a constitution in which the arrangement of the two locations on the left and right, further, the long diameter and short diameter section provided on the rotary shaft 2, and the projection 9-1 and groove 9-2 of the rotation limiting plate 9 as set out in the first aspect is reversed could also be adopted. In the third aspect of the present invention, the rotation of the rotary shaft is restricted depending on the opening/closing shaft's opening angle by use of parts like the rotation limiting plate 9 as aforementioned, however, embodiments aren't restricted to this, a part that is monolithically formed with the rotation limiting plate 9 and the casing 13 can be used. Here, since the rotation limiting plate 9 moves integrally with the casing 13 when torque is taken out, that is called as a drive body with respect to the shaft. In this case, the part is formed such that the portion of the rotation limiting plate 9 is connected with an aperture of the casing 13, and a face that abuts against the rotation limiting plate 2-3 of the rotary shaft is provided on a portion of the drive body's aperture.

As embodiments of the first to the third aspects, cases were described as above in which the rotation limiting mechanism is implemented by the rotation limiting plate 2-3 that is in contact with the rotary shaft side 2-2 on the side of the bracket 1. However, in order to reduce the size and weight, an arrangement could of course be adopted like the one in which the rotation limitation is effected by the provision of the rotation limiting plate 2-3 on the side of the stop ring 2-5.

Figure 10:
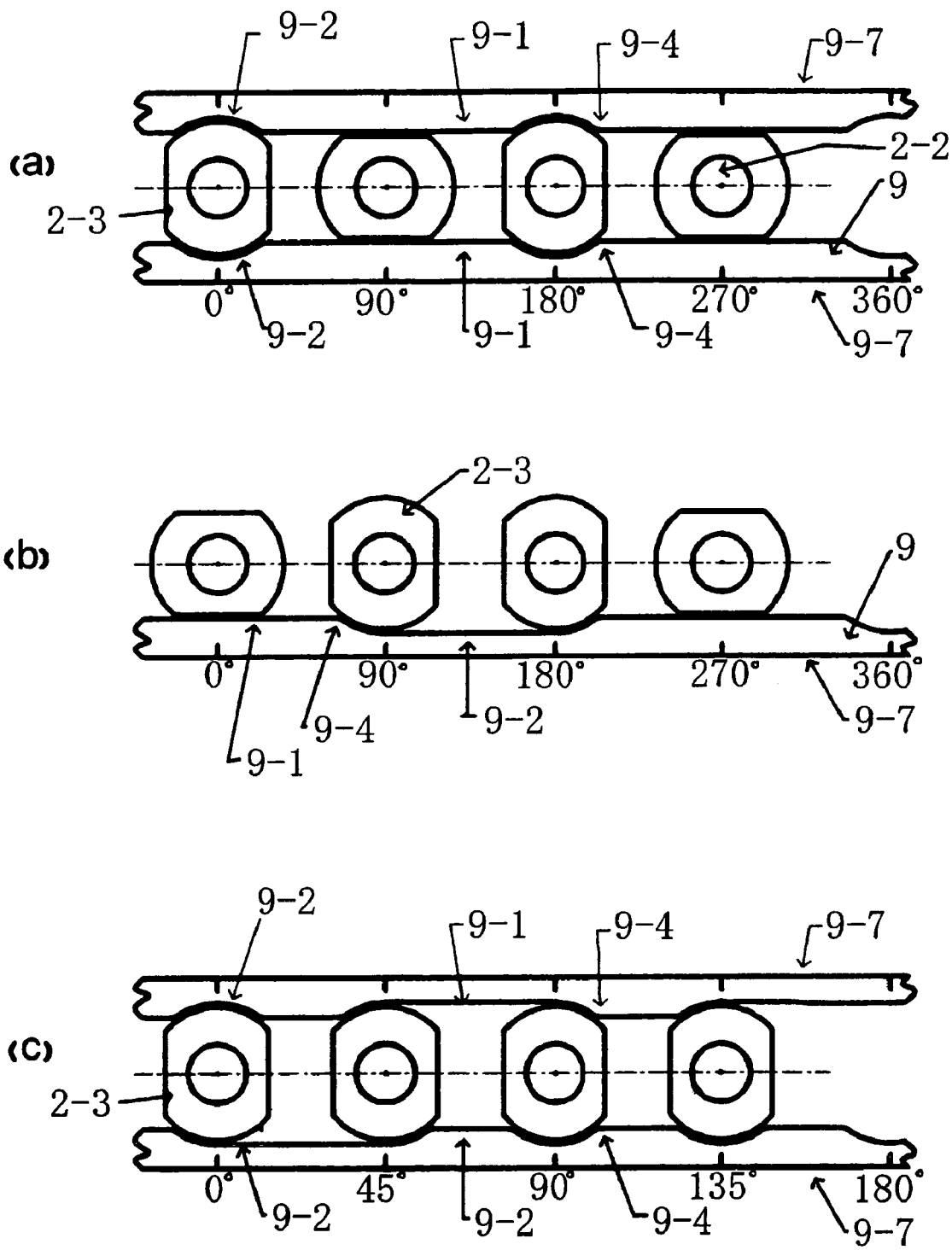
FIG. 10 is a model showing an embodiment, (a) showing the two-location limiting mechanism, (b) showing the single-location limiting mechanism and (c) showing an application of the two-location limiting mechanism.

FIG. 10 is a model given in further explanation of the rotation limiting mechanism of the two-shaft hinge of the present invention. FIG. 10 is drawn, in the form of a strip model, with only the opened-out groove section of the cylindrical rotation limiting plate (groove) 9, whose formation is comparatively easy. FIG. 10(a) is an example in which the rotation limiting mechanism is arranged in two locations on both sides of the rotary shaft, the example in which the long diameter section of the limiting plate 2-3 on the rotary shaft and the groove section 9-2 of the rotation limiting plate (groove) 9 can effect abutment at two locations of 0° and 180°, i.e. rotation of the rotary shaft 2 is possible at those points, but cannot rotate at other locations, being subject to the rotation limitation, is shown. (b) shows an example in which the mechanism is provided at a single location, the long diameter section of the limiting plate 2-3 on the rotary shaft and the groove section 9-2 can effect abutment in a limited angular range of 90° to 180°, i.e., rotation of the rotary shaft 2 is possible in this range. (c) shows an example in which the rotation limiting mechanism can be constituted in a narrow angular interval by assembly with the positions of the groove sections 9-2 of the rotation limiting plate (groove) 9 that are arranged on both sides mutually offset in position. In the example of (c), rotation of the rotary shaft 2 can be achieved at limited angles of 0°, 45°, 90°, 135° and 180°.

The shape of the rotation limiting plate 2-3 of the rotary shaft 2 is not restricted to oval-shaped, so long as long diameter sections and short diameter sections can be secured, and could, for example, even be constituted by a rectangular shape, cylinder, pin, triangular projection or gear, furthermore, it would be possible for a long-diameter shape to be formed at only one shaft diameter of the rotary shaft 2.

The rotation limiting mechanism shown in FIG. 10(b) also has the function that, if the opening/closing shaft were to be rotated from the condition in which the rotary shaft 2 is positioned in a range of 90 to 180°, i.e., where it is not subject to rotational limitation, and the short diameter section of the rotary shaft 2 and the rotation limiting groove section 9-2 face each other diagonally, then, the rotary shaft 2 is forcibly rotated to a position where the short diameter section and flat section 9-1 are in abutment, by means of the flat section 9-1 of the groove section, immediately after the short diameter (linear) section of the rotary shaft 2 contacts the starting section 9-4 of the groove section.

The rotation limiting mechanism of the present invention can be constituted as a through-type two-shaft hinge, without limitations regarding direction of rotation, angle of commencement of limitation, or angular region of the opening/closing shaft 3.

FIG. 11 shows oval-shaped rotary cams 10-1, 12-1 of the opening/closing shaft 3 employed in the opening/closing torque unit along with a spring and an opening/closing casing. The shaft holes 10-3, 12-3 are circular so as to permit rotation when the shaft sections 3-2, 3-8 are inserted. In FIGS. 11(a) and (b), the surface of the rotary cam is substantially divided into four, and projections 10-5, 12-5 and recessed faces 10-6, 12-6 are formed on the face on the opposite side. Inclined faces are formed at the locations 10-7, 12-7. The oval-shaped periphery of the rotary cam, as the componential arrangement is shown in FIG. 1, is fixed by pressing into the side wall of the casing 13-1, so that the torque generated by the cam is transmitted to the casing 13.

FIG. 12 shows fixed cams 10-2 and 12-2 that are employed in the opening/closing torque unit of the opening/closing shaft 3 and paired with the aforementioned rotary cams. The shaft holes 10-4, 12-4 permit sliding with the shaft sections 3-2, 3-8 in the axial direction, but the shaft holes 10-4, 12-4 are oval-shaped so as to rotate in unison with the shaft sections. In (a) and (b), the side face of the ring-shaped cam is substantially divided into four, and projections 10-8, 12-8 and recesses 10-9, 12-9 are formed on the face on the opposite side. Inclined faces are formed at the locations 10-10, 12-10.

The fixed and rotary cam sets for the opening/closing shaft are assembled with their projecting faces and recessed faces opposite, as shown in FIG. 6 and FIG. 1, so that sliding frictional torque or click action (pull-in action) is generated. On the other hand, at the other faces of the cams, the cams that are here employed have flat faces in order to achieve union with the spring or tight abutment with the other components.

Figure 13:
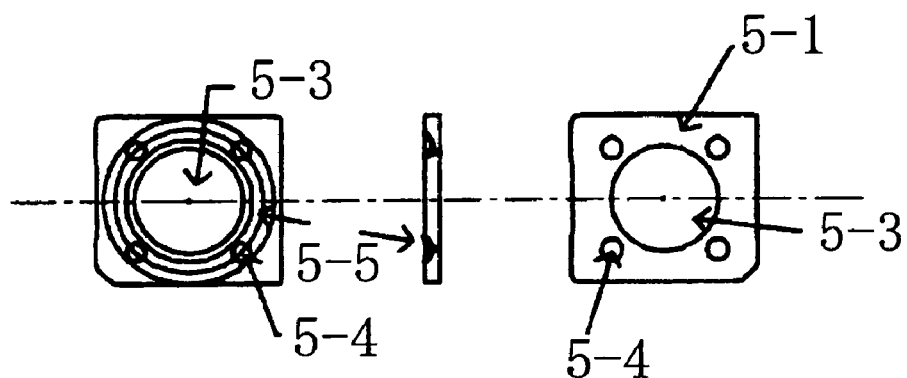
FIG. 13 shows an embodiment of a rotary cam employed in the invention, (a) being a front view, (b) being a side view and (c) being a rear view.

On the other hand, FIG. 13 shows a rotary cam 5-1 that is employed in the rotary torque unit of the rotary shaft 2. The shaft hole 5-3 is circular in shape so as to permit rotation at the location 2-4 of the rotary shaft. On one side face of the cam, there are formed, at four locations, circular recesses 5-4 and recesses 5-5 along the circumference.

Figure 14:
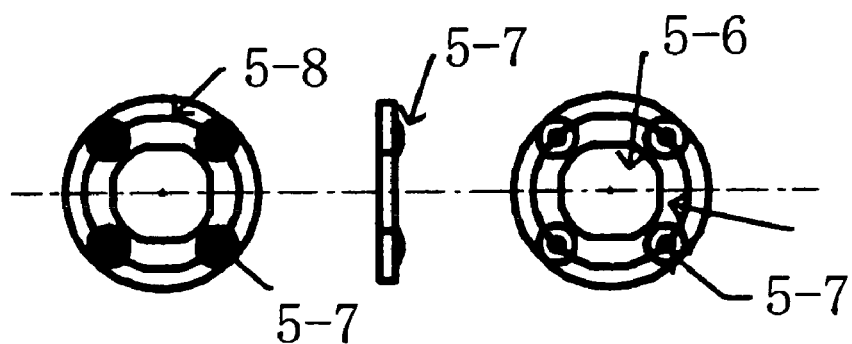
FIG. 14 shows an embodiment of a fixed cam employed in the invention, (a) being a front view, (b) being a side view and (c) being a rear view.

FIG. 14 shows a fixed cam 5-2 that is the companion with the aforementioned rotary cam and is employed in the rotary torque unit of the rotary shaft 2. The shaft hole 5-6 is capable of sliding movement in the axial direction when the section 2-4 of the rotary shaft is inserted therein and has a square shape with the four corners thereof radiused so that it rotates in unison with the shaft. Circular boss projections 5-7 are formed at four locations on the periphery, on one side face of the cam.

The fixed and rotary cam sets for the rotary shaft are assembled with projecting faces and recessed faces opposite each other as shown in FIG. 1 so that sliding frictional torque or click action (pull-in action) is generated by the relative position of the two cams. Meanwhile, at the other faces of the cams, these cams have flat faces that are employed in this case in order to achieve tight abutment with the other components.

The cam set of FIG. 11 and FIG. 12 serves as a frictional sliding torque generation region when one projection is mated with another projection, and as click action (pull-in action) region when a projection is mated with a recess. In the case of this cam set, a click action (pull-in action) is generated every time rotation takes place through 180°. In the case of the cam set of FIG. 13 and FIG. 14, a click action (pull-in action) is generated by mating of circular recesses at four locations constituted at intervals of 90° with a boss-shaped projection. This example is the two-shaft hinge and it realizes the click action as described above. The sliding frictional torque generating regions and the click action (pull-in action) regions may be of various different patterns, depending on the size and number of the angular regions along the periphery of the projections and recesses. Also, a frictional cam set having no projections or recesses could be assembled and employed.

The above fixed and rotary cams have been described for convenience as single components but in the present invention, in order to reduce the number of components or the size, combined components could be employed in which a cam is formed on part of another component.

Figure 15:
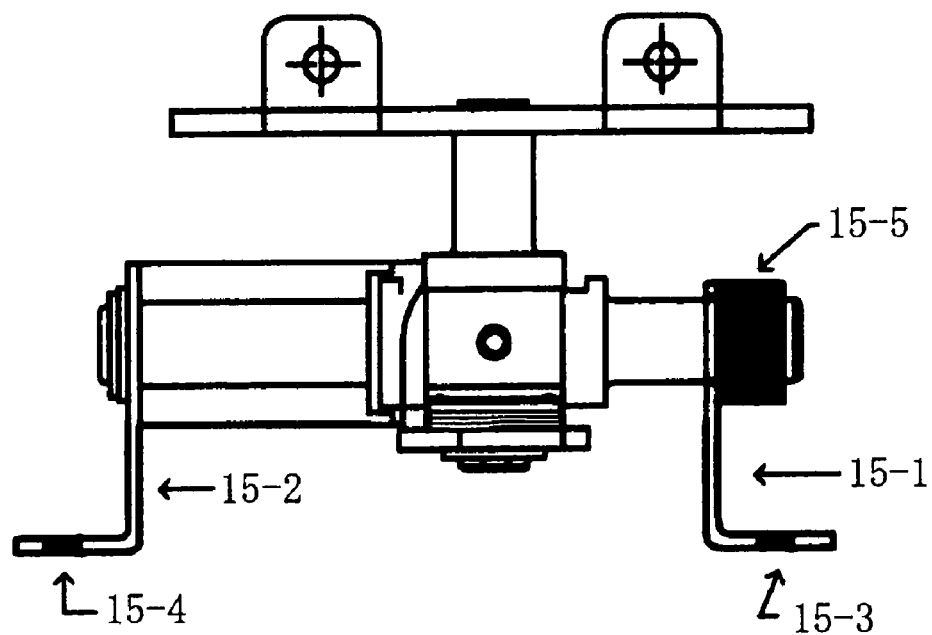
FIG. 15 is a front view showing an embodiment of the invention.
Figure 16:
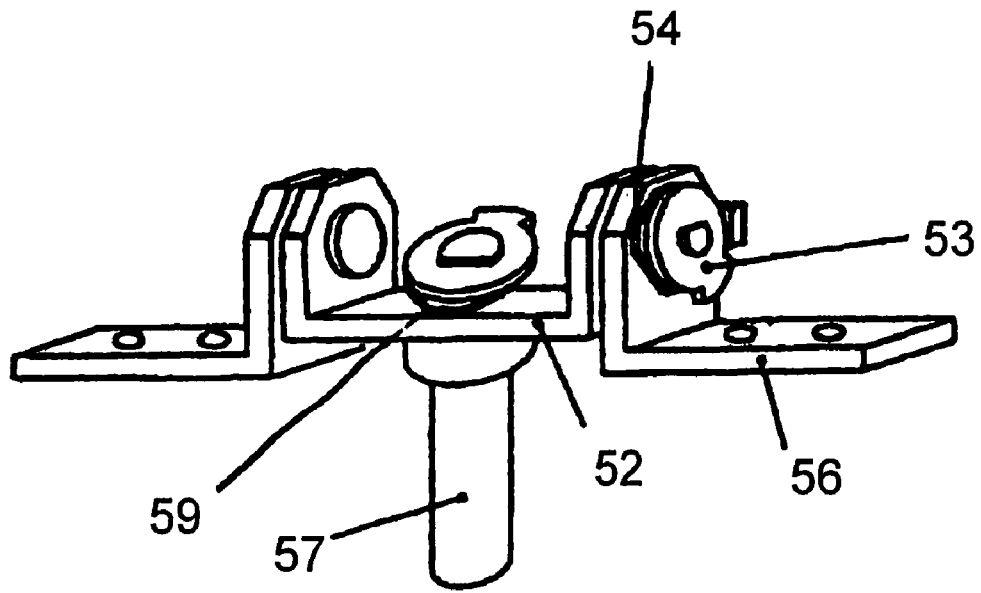
FIG. 16 is a front view showing a prior art example.

FIG. 15 shows an example of the two-shaft hinge of the ninth aspect of the present invention in which fixing brackets are added to the hinge component of the present invention. Left and right L-shaped brackets 15-1, 15-2 are formed with holes 15-3, 15-4 for fixing to the device frame using screws or the like. The L-shaped bracket 15-2 may be manufactured as a multi-function member in common with for example the stop ring 15, fixed frictional plate 14 or casing bottom plate 13-2. Also, any type of bracket 15-1 may be adopted, so long as it is of a type that is capable of supporting and fixing the opening/closing shaft 3-6, in this case, an example in which a shaft socket 15-5 is formed on the bracket 15-1 is shown.

INDUSTRIAL APPLICABILITY

The first, the second and the third aspects of the present invention show great benefits in the design of a two-shaft construction in which a rotary shaft passes through an opening/closing shaft, in greatly reducing the number of components and reducing the size of the two-shaft hinge. In the prior art product, rotation is possible no matter at what angle of the opening/closing shaft the rotary shaft is positioned. In contrast, the present invention limits the possible rotation range of the rotary shaft in accordance with the angle of rotation (inclination) of the opening/closing shaft by the provision of the rotation limiting mechanism. For example, the case of a portable terminal device in which a liquid-crystal screen for a monitor is arranged on a bracket of the rotary shaft and a keyboard is arranged on the opening/closing shaft, the benefit that an action can be achieved whereby the monitor can be rotated and viewed at an optimum specific position (for example a position at which the monitor is opened by 90°) is obtained. Furthermore, the rotation limiting mechanism has the great benefit that the inconvenience that the keyboard and the monitor of the device may collide due to rotation of the monitor can be prevented from occurring.

The present invention of the second and the fourth has the benefit that reduction in size and weight can be achieved and assembly can be simplified by concentrating the rotation limiting mechanism and the opening/closing torque generating unit in a single location. Also, from the practical viewpoint, space is released on one side of the opening/closing shaft, thus, there is the benefit that in this space an area to install components such as antenna wiring, data wiring, an image detection element or camera can be secured.

The fifth aspect of the present invention has the benefits that a high sliding torque and a large click action (pull-in action) can be obtained by a weak repulsive force provided by a coil spring. Also, since well-balanced friction is generated at both ends of the spring, the benefit that a high durability characteristic can be maintained for a long period without one-sided wear of the abutment faces of the rotary and fixed cams is obtained.

By the present invention of the sixth aspect, it is possible that the angle of rotation of the opening/closing shaft and the rotary shaft is stopped at any desired angle, whereby, stability of the hinge during use of the device can be improved, rattling can be prevented and durability/strength can be improved as the considerable benefits.

According to the seventh aspect of the present invention, there are the benefits of maintenance at a specified angle and/or stability of the hinge and improved durability, since it is made possible to produce a click action (pull-in action) towards a prescribed angle, from within a prescribed angular range.

According to the eighth aspect of the present invention, stable operation of the fixed cam is ensured and the considerable benefits of preventing a shaky feeling or rattling are obtained.

According to the ninth aspect of the present invention, there is the benefit of an expansion of the range of use of the hinge, by adopting a bracket fixing system in the case of a device having a step, or in cases where sufficient installation space cannot be secured.

The invention claimed is:

1. A two-shaft hinge enabling rotational and opening/closing movements, comprising:
   an opening/closing shaft having a through hole extending therethrough in a direction perpendicular to the axis of the opening/closing shaft and dividing the opening/closing shaft into a first segment and a second segment;
   a rotary shaft inserted through the through hole such that one end of the rotary shaft is provided at one side of the opening/closing shaft and an opposite end of the rotary shaft is provided at an opposite side of the opening/closing shaft;

a torque unit for independently generating a sliding frictional torque on the rotational and opening/closing movements on each of the rotary shaft and the opening/closing shaft and comprising a first fixed cam, a first rotary cam and a first spring provided on the one end of the rotary shaft, the first fixed cam and the first rotary cam being brought into abutting relationship with each other by the resilient force of the first spring, and a second fixed cam, a second rotary cam and a second spring provided on the first segment of the opening/closing shaft, the second fixed cam and second rotary cam being brought into abutting relationship with each other by the resilient force of the second spring; and a rotation limiting mechanism for limiting the rotational movement of the rotary shaft along the opening/closing angle range of the opening/closing shaft, the rotation limiting mechanism comprising a first oval-shaped rotation limiting plate provided on the rotary shaft and formed to have a circular long diameter section and a linear short diameter section and a second cylindrical rotation limiting plate formed to have at least one projection and at least one grooved section provided on the periphery thereof provided on the opening/closing shaft and biased by the second spring, wherein by abutting the long diameter section of the first rotation limiting plate with the at least one grooved section of the second rotation limiting plate, the rotary shaft is allowed to rotate, by abutting the short diameter section of the first rotation limiting plate with the at least one projection of the second rotation limiting plate, the rotational movement of the rotary shaft is prevented and the first rotation limiting plate is contacted by the second rotation limiting plate at two sides thereof.

2. A two-shaft hinge according to claim 1, wherein the opening/closing torque unit on the opening/closing shaft is arranged on one segment and the other segment comprises a space on which wiring is provided.

3. A two-shaft hinge according to claim 1, wherein the torque unit on the opening/closing shaft comprises units at two or more locations, the units generating a frictional torque by a repulsive force of the second spring at the abutting cam faces by abutting the second rotary cam capable of rotation and the second fixed cam that is movable in an axial direction and rotates in unison with the opening/closing shaft and engaging the second fixed cam and the second rotary cam through the opening/closing shaft.

4. A two-shaft hinge according to claim 1, wherein a range of rotation of the rotary shaft and the opening angle of the opening/closing shaft is limited by providing a stop mechanism for limiting the rotation angle of the rotary shaft and the opening angle of the opening/closing shaft.

5. A two-shaft hinge according to claim 1, wherein in order to generate a click action at a specified position during the rotational movement of the rotary shaft and the opening/closing movement of the opening/closing shaft, a mechanism that generates a click action is provided comprising a projection provided on each of the fixed cams and a recess provided in each of the first and second rotary cams on the shafts for generating torque and abutment of each projection on each of the fixed cams and the recess in each of the rotary cams, or by adding an abutment location of a projection on the rotary shaft and a recess in the opening/closing shaft.

6. A two-shaft hinge according to claim 1, wherein the rotary shaft and the opening/closing shaft respectively have a cross-section formed to be a cross-section other than circular at a sliding location of their respective fixed cams so that the respective fixed cams integrally rotates with respective shafts while sliding.

7. A two-shaft hinge according to claim 1, wherein the two-shaft hinge further comprises at least two bracket components provided on each end of the opening/closing shaft to dispose and fix the two-shaft hinge to an outer frame, and the hinge is fixed by the brackets.

8. A two-shaft hinge enabling rotational and opening/closing movements, comprising:

an opening/closing shaft having a through hole extending therethrough in a direction perpendicular to the axis of the opening/closing shaft and dividing the opening/closing shaft into a first segment and a second segment;

a rotary shaft inserted through the through hole such that one end of the rotary shaft is provided at one side of the opening/closing shaft and an opposite end of the rotary shaft is provided at an opposite side of the opening/closing shaft;

a torque unit for independently generating a sliding frictional torque on the rotational and opening/closing movements on each of the rotary shaft and the opening/closing shaft and comprising a first fixed cam, a first rotary cam and a first spring provided on the one end of the rotary shaft, the first fixed cam and the first rotary cam being brought into abutting relationship with each other by the resilient force of the first spring, and a second fixed cam, a second rotary cam and a second spring provided on the first segment of the opening/closing shaft, the second fixed cam and second rotary cam being brought into abutting relationship with each other by the resilient force of the second spring; and a rotation limiting mechanism for limiting the rotational movement of the rotary shaft along the opening/closing angle range of the opening/closing shaft, the rotation limiting mechanism comprising a first oval-shaped rotation limiting plate provided on the rotary shaft and formed to have a circular long diameter section and a linear short diameter section and a second cylindrical rotation limiting plated formed to have at least one projection and at least one grooved section provided on the periphery thereof provided on the opening/closing shaft and biased by the second spring, wherein by abutting the long diameter section of the first rotation limiting plate with the at least one grooved section of the second rotation limiting plate, the rotary shaft is allowed to rotate, and by abutting the short diameter section of the first rotation limiting plate with the at least one projection of the second rotation limiting plate, the rotational movement of the rotary shaft is prevented, and the first rotation limiting plate is contacted by the second rotation limiting plate at one side thereof.

9. A two-shaft hinge according to claim 8, wherein the opening/closing torque unit on the opening/closing shaft is arranged on one segment and the other segment comprises a space on which wiring is provided.

10. A two-shaft hinge according to claim 8, wherein the opening/closing torque unit of the opening/closing shaft comprises units at two or more locations, the units generating a frictional torque by a repulsive force of the second spring at abutting cam faces by abutting the second rotary cam capable of rotation and the second fixed cam that is movable in an axial direction and rotates in unison with the opening/closing shaft and engaging the second fixed cam and the second rotary cam through the opening/closing shaft.

11. A two-shaft hinge according to claim 8, wherein a range of rotation of the rotary shaft and the opening angle of the opening/closing shaft is limited by providing a stop mechanism for limiting the rotation angle of the rotary shaft and the opening angle of the opening/closing shaft.

12. A two-shaft hinge according to claim 8, wherein in order to generate a click action at a specified position during the rotational movement of the rotary shaft and the opening/closing movement of the opening/closing shaft, a mechanism that generates a click action is provided comprising a projection provided on each of the fixed cams and a recess provided in each of the first and second rotary cams on the shafts for generating torque and abutment of each projection on each of the fixed cams and the recess in each of the rotary cams, or by adding an abutment location of a projection on the rotary shaft and a recess in the opening/closing shaft.

13. A two-shaft hinge according to claim 8, wherein the rotary shaft and the opening/closing shaft respectively have a cross-section formed to be a cross-section other than circular at a sliding location of their respective fixed cams so that the respective fixed cams integrally rotates with respective shafts while sliding.

14. A two-shaft hinge according to claim 8, wherein the two-shaft hinge further comprises at least two bracket components provided on each end of the opening/closing shaft to dispose and fix the two-shaft hinge to an outer frame, and the hinge is fixed by the brackets.

* * * * *